United States Patent [19]

Snook

[11] Patent Number: 4,865,483

[45] Date of Patent: Sep. 12, 1989

[54] BLOW-MOLDED NOTEBOOK BINDER

[75] Inventor: Marvin G. Snook, Rocky Mt., N.C.

[73] Assignee: W. R. Grace & Co., Duncan, S.C.

[21] Appl. No.: 205,149

[22] Filed: Jun. 10, 1988

[51] Int. Cl.[4] ........................ B42F 13/00; B42F 21/00; B29D 27/00; B65D 73/00

[52] U.S. Cl. .................................... 402/80 R; 283/38; 425/526; 206/328

[58] Field of Search ............... 402/79, 80 R; 206/328, 206/329, 334, 672; 425/526, 531, 543; 264/524, 527, 529; 283/38

[56] References Cited

U.S. PATENT DOCUMENTS

| | | | |
|---|---|---|---|
| 2,677,376 | 5/1954 | Brunner | 402/79 |
| 3,311,684 | 3/1967 | Heider | 425/526 |
| 3,317,955 | 5/1967 | Schurman et al. | 425/526 |
| 3,635,624 | 1/1972 | Nakakoshi et al. | 425/526 |
| 4,516,871 | 5/1985 | Leitman | 283/38 |
| 4,609,104 | 9/1986 | Kasper et al. | 206/328 |
| 4,610,353 | 9/1986 | Young | 206/328 |
| 4,677,809 | 7/1987 | Long et al. | 206/328 |
| 4,684,020 | 8/1987 | Ohlbach | 206/328 |
| 4,756,414 | 7/1988 | Mott | 206/328 |

*Primary Examiner*—Frank T. Yost
*Assistant Examiner*—Paul M. Heyrank, Sr.
*Attorney, Agent, or Firm*—John J. Toney; William D. Lee, Jr.; Mark B. Quatt

[57] ABSTRACT

A blow-molded notebook binder provides protection from mechanical shock and abuse. When antistatic and/or conductive agents are blended into the polymeric material to make up the parison for the notebook binder, protection from electrostatic discharge is also provided. This invention finds special use in clean room environments.

6 Claims, 1 Drawing Sheet

BLOW-MOLDED NOTEBOOK BINDER

FIELD OF THE INVENTION

The field of the invention encompasses notebook binders, particularly notebook binders which are blow-molded, and more particularly, blow-molded notebook binders which prevent undesired electrostatic discharge from the surfaces of the binder.

BACKGROUND OF THE INVENTION

When two bodies, particularly of unlike materials, are brought together into intimate contact, a redistribution of electrons across the interface is likely to occur. An attractive force is established as equilibrium is achieved. Work must be done in opposition to these attractive forces if and when the bodies are separated. The energy so expended manifests itself as an increase in electrical tension or voltage between the respective surfaces, which become electrically charged with respect to each other. If a conductive path is available, the charges thus separated will reunite immediately. If no such path is available, as in the case of nonconductors, the potential increase with separation may reach values of several thousand volts. The generation of such electrical forces by contact is known as triboelectricity.

The charge on a charged object will be located on the exterior surface thereof, and these forces have a strong influence on nearby objects. If a neighboring object is a conductor it will experience a separation of charges by induction. Its repelled charge is free to give or receive electrons as the case may be; if another conductor is brought near, the transfer may occur through the agency of the spark, very often an energetic spark.

Triboelectrically generated charges may adversely affect or even electronically destroy a number of electronic circuits or solid state devices sensitive to sudden or stray electric charges or static electricity. Micro-circuit devices such as integrated circuit chips may be destroyed or weakened by electrostatic discharge prior to their incorporation into the electrical or electronic equipment for which they were designed. Damage from electrostatic discharge may make such devices prone to latent or catastrophic failure during use To prevent electrostatic breakdown, containers in which such devices are stored and transported have been provided with means for short circuiting the device terminals or pins. This short circuiting serves to prevent the accumulation of potentially damaging static charges on the device.

U.S. Pat. No. 4,171,049 discusses the utilization of a series of conductive slots or grooves in which solid state devices may be inserted and later dispensed to manufacturing equipment.

Other containers have been developed for portable use as for example in the device replacement market. These are typically small box like containers that house conductive sponge or foam sheets into which the device terminals are temporarily imbedded. An example is found in U.S. Pat. No. 4,333,565.

Another means well known in the art for providing protection of solid state devices is the use of carbon black or carbon powder in varying amounts in the material forming the container for the solid state devices.

U.S. Pat. No. 4,494,651 issued to Malcolm discloses a portable work station in which electrically conductive material, such as carbon black particles, aluminum particles, and metal filings, is blended with thermoplastic material to make an electrically conductive case.

While much attention has been directed to the provision of conductive or antistatic containers, or containers with a combination of such properties for the storage of devices sensitive to electrostatic discharge, a corresponding need is present for ancillary equipment and materials which do not negate the advantages obtained by the use of the special containers discussed above.

Documentation in the form of conventional sheets of paper, and other written matter, is frequently associated with the production, of electrically sensitive hardware and components thereof, such as computer equipment and circuit boards. A conventional notebook binder used to store or compile such written materials typically has a broad surface, and is sometimes subject to the same triboelectric defects discussed earlier.

In many special environments such as clean room environments in the computer component industry and other industries, documentation in the form of data sheets, progress reports, and the like is desirably compiled in some form of notebook in order to meet standard operating practice for recording data, keeping track of production runs, order data, and the like.

In each case, it is desirable to house such documentation in a binder which will not present the risk of the generation of an electrostatic discharge, and the destruction or impairment of electrostatically sensitive components near the binder.

It is therefore an object of the present invention to provide a notebook binder which has either a conductive or an antistatic surface to reduce or eliminate the possibility of inadvertent and undesirable electrostatic discharge into the working environment.

It is also an object of the present invention to make a binder that has been blow-molded, preferably in a double-wall configuration, to provide resistance to mechanical abuse during normal usage.

SUMMARY OF THE INVENTION

In one aspect of the present invention, a blow-molded notebook binder comprises a first double-walled cover member; a second double-walled cover member of substantially the same dimensions as the first cover member; a spine disposed between the first and second cover member; a first integral hinge joining the spine to the first cover member; a second integral hinge joining the spine to the second cover member; and means for holding a plurality of paper sheets between the first and second cover members when the binder is in a closed position.

In another aspect of the present invention, a method of making a blow-molded notebook binder comprises the steps of blow-molding a parison to provide a notebook binder with a first double-walled cover member, a second double-walled cover member, a spine, and integral hinges connecting the spine to the first and second cover members respectively; and attaching to the spine a means for holding a plurality of papers between the first and second cover members when the binder is in a closed position.

DEFINITIONS

The term "electrically conductive", and similar terms, are used herein to describe a material having a surface resistivity of less than $10^5$ ohms/square (Department of Defense Standards).

The term "solid state device" is used herein to describe devices such as electronic devices whose utility may be impaired or destroyed by charge transfer actions, static electricity, or electrostatic discharge.

The term "antistatic" as used herein describes material having a surface resistivity in the range of about $10^9$ to $10^{14}$ ohms/square (Department of Defense Standard) and/or a material which can dissipate 99% of an applied static charge of +5000 volts direct current in a short amount of time, preferably less than 20 seconds, more preferably less than 5 seconds, most preferably less than 2 seconds (Federal Test Method Standard 101C, Method 4046.1, "Electrostatic Properties of Materials"), and/or a material having a surface resistivity in the range of about $10^5$ to $10^{13}$ ohms/square (Electronics Industry Association Standard).

The term "parison" is used herein to refer to a hollow tube or other preformed shape of a thermoplastic material or blend or aggregation of thermoplastic materials which is inflated inside a mold in the blow molding process.

"Polymeric resin" as used herein includes but is not limited to for example homopolymers, copolymers, terpolymers etc., and blends and modifications thereof and more specifically polyolefins as defined hereunder. Polyesters, polyamides, polycarbonates and the like are also included herein.

The term "outer layer" is used herein to refer to a layer of a multi-layer parison which comprises an outer surface thereof.

The term "inner layer" is used herein to refer to a layer of a multi-layer parison other than the outer layer, such as an intermediate layer or innermost layer of the parison.

The term "intermediate layer" is used herein to refer to a layer of a multi-layer parison positioned between an outer layer and an innermost layer.

The term "polyolefin" is used herein to refer to a polymer of olefins such as ethylene, propylene, etc., and copolymers and modifications thereof, such as linear low density polyethylene (LLDPE) and ethylene vinyl acetate copolymer.

The term "regrind" is used herein to refer to waste material such as excess parison material from blow-molding operations, which is reclaimed by for example shredding or granulating of the excess material. This regrind material is generally mixed with other unprocessed material at some predetermined percentage.

"Exposed surface" is used herein to indicate those surfaces of a container, including the outside surface of a closed container as well as the surfaces exposed by opening the container, which may be said to be exposed to the atmosphere.

DETAILED DESCRIPTION OF THE PREFERRED EMBODIMENT

Figure 1:
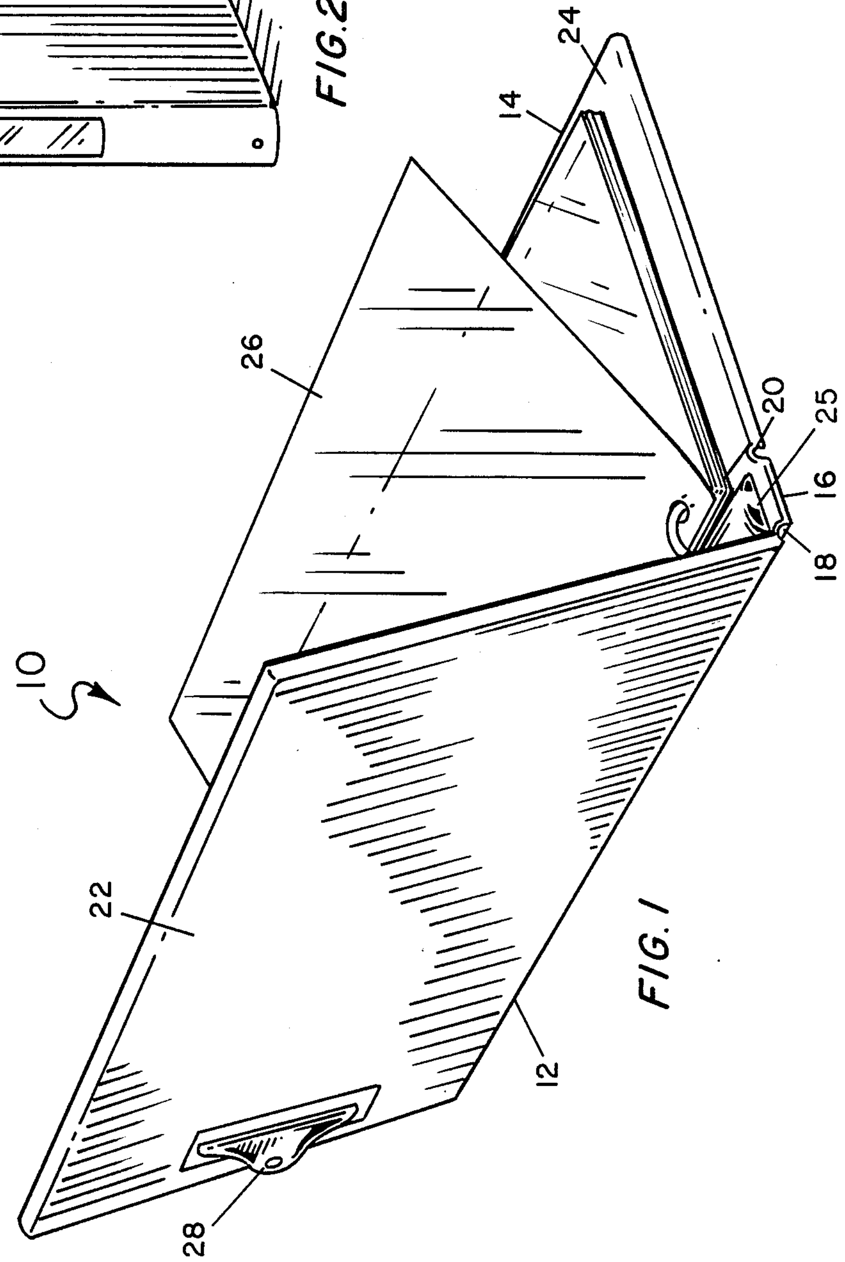
FIG. 1 is a perspective view of a blow-molded notebook binder in accordance with the present invention.

Referring to FIG. 1, a parison is extruded and formed into a blow-molded notebook binder 10. Binder 10 includes a first double-walled cover member 12, and a second double-walled cover member 14. A spine 16 is connected to the first and second double-walled cover members by means of integral hinges 18 and 20 respectively.

An immediate advantage apparent from the double-walled blow-molded construction of the notebook binder as depicted in FIG. 1 is the elimination of the need for a paper filler between the exterior surfaces 22 and interior surfaces 24 of the first and second double-walled cover members. Double-walled construction is well known in the blow-molded container art, and provides resistance to mechanical shock and abuse.

Figure 2:
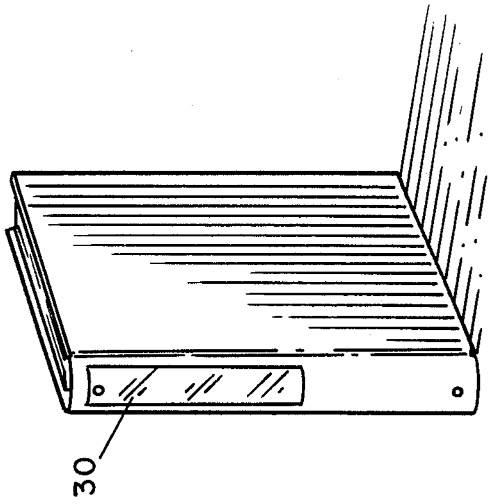
FIG. 2 is a perspective view of a blow-molded notebook binder in an upright and closed position.

A conventional metal ring 25 or other type of fastener can be attached to the interior surface of the spine in order to secure perforated sheets 26 or sheet retaining members which can contain sheets of paper. Optional accessories can include such items as a clip 28 on an exterior surface 22 of cover member 12, and a label area 30 (see FIG. 2) for identifying the contents of the notebook binder.

While a double-walled, blow-molded notebook binder in itself is a novel application of the blow-molding art, this invention can be particularly useful in clean room environments. In this connection, conductive and/or antistatic materials can be blended into the polymeric resin, such as polyolefins, which form the parison from which the notebook binder is made. Thus, the parison may be a monolayer or multilayer parison in which one or more layers of polymeric resin having blended therewith an antistatic or conductive agent can be used in connection with this invention. In clean room environments, or other environments in which electrostatic discharge may persent a problem or threat to product integrity, it is often necessary to maintain records of work completed, production figures, and other data. At a work station that is ortherwise protected from undesirable electrostatic discharge, the presence of a notebook binder which is of the conventional type can present a source of undesirable electrostatic discharge. By incorporating antistatic or conductive agents in the polymeric material forming the parison of the present notebook binder, this invention not only provides a binder which resists mechanical shock and abuse, but also protects against electrostatic discharge resulting from a charge build up on the surfaces of the notebook binder.

Conductive agents useful in the present invention include carbon black, carbon fibers, and the like. These are preferably pre-blended with a polymeric resin such as a polyolefin, and more preferably a high density polyethylene, prior to the extrusion of the parison.

Antistatic agents suitable for use in the invention may include for example an organic liquid with acts as a wetting agent, or for example ionic surface-active agents which will migrate to the surface of the binder to provide the antistatic characteristics necessary in the surface of the binder. Other antistatic agents can also be used in connection with the present invention, including aromatic sulfonamides, polyalkoxylated compounds, fatty acid esters of polyhydroxy alcohols, blends of the polyalkoxylated compounds and fatty acid esters of polyhydroxy alcohols, and mixtures of an acid copolymer and a quaternary amine.

The inserts 26 for storing paper sheets may themselves be treated or fabricated from materials which include antistatic and/or conductive agents such as those described above, in order to provide further protection against electrostatic discharge.

The means 25 for holding the plurality of papers between the first and second double-walled covers may be a conventional metal ring, or thermoplastic materials which have been made so as to provide a conductive and/or antistatic property to the means 25. The same is true of options such as the clip 28.

A preferred method of manufacturing the container is blow molding. Blow molding is generally well known to those of ordinary skill in the art, as illustrated by U.S. Pat. Nos. 3,452,125 and 3,317,955 disclosing blow molding techniques and methods. In practice, a blend of a polymeric resin such as a polyolefin, more preferably linear low density polyethylene, is blended with any suitable antistatic agent. Alternatively, a second blend of a polymeric resin such as a polyolefin, more preferably polyethylene, and most preferably high density polyethylene, is blended with carbon black or conductive fibers such as carbon fibers in a relatively small percentage, for example about 10% of the carbon or fibers in relation to the total weight of the blend layer. Either or both of these blends are then extruded or coextruded with the first blend as an outer layer and the second blend as an inner layer, or vice versa and optionally with an additional inner layer of a polymeric material and/or regrind material in the event that a multilayer construction is desired. The materials are heated to a temperature whereby the thermoplastic materials may be extruded as a parison and blow-molded into the desired shape or configuration as is well known in the art.

FIG. 1 shows a resulting blow molded notebook binder 10 wherein the parison has been blow-molded to form the first cover member 12 and second cover member 14 of the binder. It can be seen from FIG. 2 that when the binder 10 is closed, the first cover member 12 and the second cover member 14 substantially enclose contained sheets 26. Thus an antistatic or conductive surface is provided on the outside and inside exposed surfaces of binder 10.

Although the present invention has been described in connection with preferred embodiments, one skilled in the art will understand that modifications may be made without departing from the scope of the invention.

Also, although the embodiments have been directed to a blow-molded notebook binder of double-wall design, clearly a single-wall container can be made which nevertheless utilizes to advantage the antistatic and/or electrically conductive features of this invention. Additionally, containers of related molding techniques may nevertheless take advantage of the antistatic or conductive feature of the invention. Injection molding is an example of another molding technique.

What is claimed is:

1. A blow-molded notebook binder comprises:

(a) a first double-walled cover member;

(b) a second double-walled cover member of substantially the same dimensions as the first cover member , said double-walled cover members comprising a blend of a polymeric material and an electrically conductive or antistatic agent;

(c) a spine disposed between the first and second cover member;

(d) a first integral hinge joining the spine to the first cover member;

(e) a second integral hinge joining the spine to the second cover member; and (f) means for holding a plurality of papers between the first and second cover members when the binder is in a closed position.

2. A blow-molded notebook binder according to claim 1 wherein the conductive material is carbon black.

3. A blow-molded notebook binder according to claim 1 wherein the spine is coextensive with the vertical dimensions of the respective cover members when the notebook binder is in an upright position.

4. The blow-molded notebook binder of claim 1 wherein the means for holding a plurality of paper comprises at least one ring suitable for securely holding a plurality of paper sheets.

5. A blow-molded notebook binder according to claim 1 further comprising antistatic cover sheets to retain individual paper sheets within the notebook binder.

6. A method for making a blow-molded notebook binder comprising:

(a) blending a polymeric material with an electrically conductive or antistatic agent;

(b) extruding the blend of a) as a parison;

(c) blow-molding the parison to provide a notebook binder with a first double-walled cover member, a second double-walled cover member, a spine, and first and second integral hinges connecting the spine to the first and second cover memberes respectively; and (d) attaching a holding means to the spine for securing a plurality of papers within the notebook binder.

* * * * *